(12) United States Patent
Andreychuk

(10) Patent No.: US 9,194,512 B2
(45) Date of Patent: Nov. 24, 2015

(54) COILED TUBING WITH HEAT RESISTANT CONDUIT

(71) Applicant: Mark Andreychuk, Calgary (CA)

(72) Inventor: Mark Andreychuk, Calgary (CA)

(*) Notice: Subject to any disclaimer, the term of this patent is extended or adjusted under 35 U.S.C. 154(b) by 0 days.

(21) Appl. No.: 14/337,821

(22) Filed: Jul. 22, 2014

(65) Prior Publication Data

US 2014/0345742 A1    Nov. 27, 2014

Related U.S. Application Data

(60) Continuation-in-part of application No. 14/022,901, filed on Sep. 10, 2013, now Pat. No. 8,827,140, which is a division of application No. 12/113,069, filed on Apr. 30, 2008, now Pat. No. 8,567,657.

(60) Provisional application No. 60/914,830, filed on Apr. 30, 2007.

(51) Int. Cl.
*B23K 31/02*     (2006.01)
*F16L 9/02*      (2006.01)
*E21B 17/02*     (2006.01)
*E21B 17/20*     (2006.01)
*H02G 1/08*      (2006.01)

(52) U.S. Cl.
CPC ............. *F16L 9/02* (2013.01); *B23K 31/027* (2013.01); *E21B 17/023* (2013.01); *E21B 17/203* (2013.01); *E21B 17/206* (2013.01); *H02G 1/08* (2013.01); *B23K 2201/06* (2013.01)

(58) Field of Classification Search
None
See application file for complete search history.

(56) References Cited

U.S. PATENT DOCUMENTS

| 183,348 A | 10/1876 | Warhurst |
| 2,067,078 A | 1/1937 | Alfred |
| 2,151,206 A | 3/1939 | Hawthorn |
| 2,423,697 A | 7/1947 | Garfield |
| 2,806,429 A | 9/1957 | Anderson |
| 2,929,408 A | 3/1960 | Smith |
| 3,110,754 A | 11/1963 | Witort |

(Continued)

FOREIGN PATENT DOCUMENTS

| GB | 2190457 | 11/1987 |
| JP | 59097717 A | * 6/1984 |

OTHER PUBLICATIONS http://web.archive.org/web/20070409152233/http://www.tenaris.com/CoiledTubes/en/def . . . printed Feb. 27, 2014.

(Continued)

*Primary Examiner* — Kiley Stoner
(74) *Attorney, Agent, or Firm* — Goodwin Law; Linda M. Thompson

(57) ABSTRACT

Coiled tubing is provided with one or more conduits passing through and secured to an inner wall of the coiled tubing. The conduits are resistant to annealing temperatures and therefore are welded to flat plate which is used for forming the coiled tubing or are retained in a groove formed in the inner wall of the coiled tubing. When the coiled tubing is formed by rolling the flat plate into a slit tubular and seam welding the longitudinal joint, the coiled tubing and the heat resistant conduits are annealed. The conduit can be wireline, electric line, cable or an empty tubular, all of which are resistant to the annealing temperatures. The empty tubular can be used to retain a secondary conduit such as heat labile fiber optic cable which is run into the empty tubular, such as by pumping or floating, after the annealing process.

27 Claims, 17 Drawing Sheets

(56) References Cited

U.S. PATENT DOCUMENTS

| | | | | |
|---|---|---|---|---|
| 3,716,908 A | * | 2/1973 | Rowell | 228/103 |
| 4,066,201 A | * | 1/1978 | Bleckmann | 228/115 |
| 4,098,476 A | | 7/1978 | Jutte et al. | |
| 4,200,297 A | | 4/1980 | Tricon | |
| 4,239,013 A | | 12/1980 | Haynes | |
| 4,498,532 A | | 2/1985 | Mason | |
| 4,570,707 A | | 2/1986 | Setterberg, Jr. | |
| 4,971,147 A | | 11/1990 | Thomeer | |
| 5,018,260 A | | 5/1991 | Ziu | |
| 5,121,872 A | * | 6/1992 | Legget | 228/148 |
| 5,122,209 A | | 6/1992 | Moore et al. | |
| 5,191,173 A | | 3/1993 | Sizer et al. | |
| 5,339,867 A | * | 8/1994 | Iorio et al. | 138/140 |
| 5,429,194 A | | 7/1995 | Nice | |
| 5,435,351 A | * | 7/1995 | Head | 138/111 |
| 5,456,405 A | | 10/1995 | Stagg | |
| 5,467,826 A | | 11/1995 | Miller | |
| 5,490,542 A | | 2/1996 | Iorio et al. | |
| 5,542,472 A | * | 8/1996 | Pringle et al. | 166/65.1 |
| 5,573,225 A | | 11/1996 | Boyle et al. | |
| 5,582,748 A | * | 12/1996 | Yoshie et al. | 219/121.64 |
| 5,613,631 A | | 3/1997 | Ziemek et al. | |
| 5,646,372 A | * | 7/1997 | Sasaki et al. | 174/126.2 |
| 5,699,996 A | | 12/1997 | Boyle et al. | |
| 5,920,032 A | | 7/1999 | Aeschbacher et al. | |
| 5,942,132 A | | 8/1999 | Toyooka et al. | |
| 5,946,788 A | | 9/1999 | Griffioen et al. | |
| 5,950,298 A | | 9/1999 | Griffioen et al. | |
| 5,975,404 A | | 11/1999 | Ziemek et al. | |
| 6,112,813 A | | 9/2000 | Head | |
| 6,143,988 A | | 11/2000 | Neuroth et al. | |
| 6,148,925 A | | 11/2000 | Moore | |
| 6,179,269 B1 | | 1/2001 | Kobylinski | |
| 6,318,463 B1 | | 11/2001 | Fehrmann et al. | |
| 6,442,304 B1 | | 8/2002 | Crawley et al. | |
| 7,152,685 B2 | | 12/2006 | Adnan et al. | |
| 7,832,077 B2 | | 11/2010 | Crawford | |
| 7,897,267 B2 | * | 3/2011 | Hoyt et al. | 428/679 |
| 8,413,690 B2 | | 4/2013 | Crawford | |
| 2001/0018977 A1 | | 9/2001 | Kilgore | |
| 2002/0100360 A1 | | 8/2002 | Rochen et al. | |
| 2002/0170612 A1 | * | 11/2002 | Penza | 138/108 |
| 2003/0021840 A1 | | 1/2003 | Infeld et al. | |
| 2003/0216761 A1 | | 11/2003 | Shiber | |
| 2004/0060735 A1 | | 4/2004 | Beckman | |
| 2004/0163801 A1 | | 8/2004 | Dalrymple et al. | |
| 2004/0182581 A1 | | 9/2004 | Schetky et al. | |
| 2005/0005983 A1 | * | 1/2005 | Lewis | 138/41 |
| 2005/0006899 A1 | * | 1/2005 | Lewis | 285/370 |
| 2005/0006900 A1 | * | 1/2005 | Lewis | 285/370 |
| 2005/0075647 A1 | | 4/2005 | Walters et al. | |
| 2005/0155773 A1 | | 7/2005 | Wetzel et al. | |
| 2005/0167098 A1 | | 8/2005 | Lovell et al. | |
| 2005/0223768 A1 | | 10/2005 | Kelder et al. | |
| 2006/0289074 A1 | * | 12/2006 | Eriksson et al. | 138/171 |
| 2007/0016072 A1 | | 1/2007 | Grunwald et al. | |
| 2007/0044960 A1 | * | 3/2007 | Lovell et al. | 166/250.07 |
| 2007/0151764 A1 | | 7/2007 | Bloom et al. | |
| 2007/0246446 A1 | * | 10/2007 | Lee et al. | 219/121.64 |
| 2008/0053702 A1 | | 3/2008 | Smith, Jr. | |
| 2008/0149348 A1 | | 6/2008 | DiFoggio et al. | |
| 2009/0126943 A1 | | 5/2009 | Roaldsnes | |
| 2015/0028168 A1 | * | 1/2015 | Morris | 248/68.1 |
| 2015/0030480 A1 | * | 1/2015 | Dalrymple et al. | 417/423.3 |

OTHER PUBLICATIONS 10.08.KES1797 © 2007-2008 Key Energy Services; Coiled tubing unit; Technical Data Sheet.

Shell Distributed Temperature Sensing Primer—EP 2003-7100 May 2003.

sensornet—Installing Fibre Optic Cables; http://www.sensornet.co.uk/download-news/faqs/74-installing-fibre-optic-cables.html[Apr. 7, 2014 12:55:38 PM].

\* cited by examiner

FIG. 2A.5

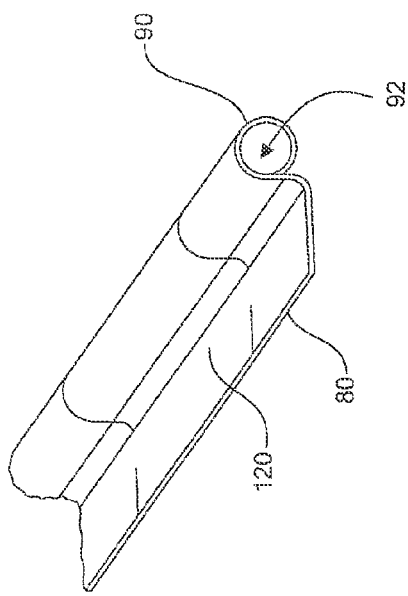
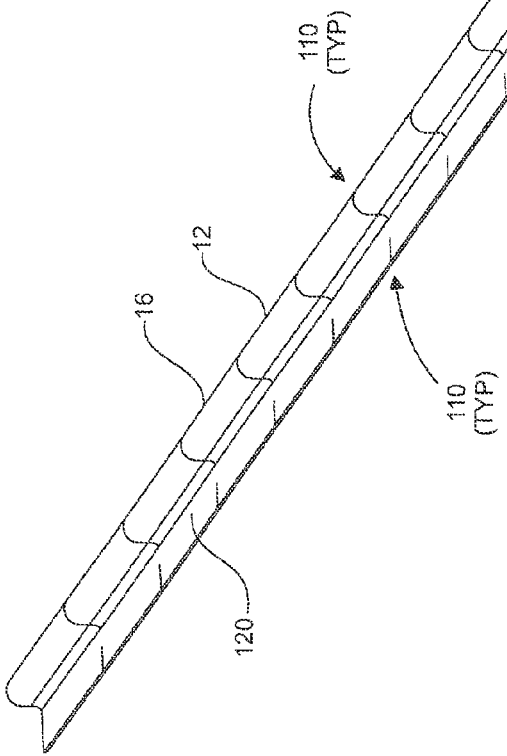

COILED TUBING WITH HEAT RESISTANT CONDUIT

CROSS REFERENCE TO RELATED APPLICATIONS

This application is a continuation-in-part application of U.S. patent application Ser. No. 14/022,901, filed Sep. 10, 2013 which is a Divisional of U.S. patent application Ser. No. 12/113,069, filed Apr. 30, 2008, now issued as U.S. Pat. No. 8,567,657 on Oct. 29, 2013, and claiming priority of U.S. Patent Application No. 60/914,830, filed Apr. 30, 2007, the entirety of all of which are incorporated herein by reference.

FIELD

Embodiments disclosed herein relate generally to coiled tubing. More particularly, embodiments relate to coiled tubing with a conduit secured within the coiled tubing.

BACKGROUND

Coiled tubing (CT) (also referred to as endless tubing or continuous tubing) is frequently used for down hole well completions, operations, servicing, etc.

Coiled tubing is typically manufactured from flat plate which is formed into a tubular, longitudinally (or otherwise) welded, heat treated, pressure tested, and rolled into a coil. Heat treating may include annealing.

Some down hole operations benefit from being able to convey electrical power from surface to the bottom hole assembly (BHA) or to communicate signals from surface to the BHA or from the BHA to surface. Wireline is frequently used for these electrical power (may also be referred to as electric line) or communication signals. Examples include directional control or measurement tools, pressure/temperature and other sensors, packers etc.

Wireline can be loosely inserted into finished coiled tubing, for example, by uncoiling the coiled tubing and then pumping a steel cable through the coiled tubing using a cup and then using the steel cable to pull (fish) the wireline through the coiled tubing and recoiling the coiled tubing, by uncoiling the coiled tubing into a well bore and using gravity to drop the wireline into the CT (U.S. Pat. No. 6,148,925 to Moore), or by pumping the wireline into the coiled tubing with the coiled tubing on the reel (U.S. Pat. No. 5,699,996 and U.S. Pat. No. 5,429,194).

Wireline can instead be inserted into coiled tubing during the manufacturing process, for example, by using a spring guide to position the electrical conductor to the side opposite the welding operation and providing cooling to reduce the heat damage to the electrical conductor (U.S. Pat. No. 5,122,209 to Moore et al.), or by using a cable placement tube which conducts coolant along the electrical conductor to prevent heat degradation (the cable placement tube extending past the welding operation and the subsequent heat treating operation) (U.S. Pat. No. 5,121,872 to Legget).

The unrestrained wireline in coiled tubing has a number of problems, including, when the coiled tubing with wireline combination is roiled onto a reel or unrolled from the reel, the difference in radius of the unrestrained wireline results in slack and length problems, during operations, fluid flow past the unrestrained wireline results in slack problems, birdcaging, and in deviated or horizontal wells, the difference in radius results in slack and length problems.

It is, therefore, desirable to provide coiled tubing with wireline secured within.

SUMMARY

Embodiments of methods for manufacturing coiled tubing disclosed herein incorporate one or more heat resistant conduits, which include, but are not limited to, heat resistant wireline, electric line or cable and empty tubulars, into the coiled tubing during the manufacture. The empty tubular may be used for installing secondary conduits, such as fiber optics, therein after the coiled tubing is manufactured or for flowing a fluid, such as a hydraulic fluid therethrough. Further, if the heat resistant conduit is a cable, the cable may have an empty tubular or a small, open bore formed therein for secondary conduits or fluid flow. The heat resistant conduits are sized and arranged so as to leave a major portion of the bore of the coiled tubing unobstructed for flowing fluids or deploying apparatus therethrough. Where the conduits are heat resistant electric line or cables, the coiled tubing is capable of providing electric power downhole and further, is capable of transmitting and receiving data and control signals between surface and downhole tools.

In one broad aspect, a method of manufacturing coiled tubing from a strip of metal flat plate comprises welding one or more heat resistant conduits, at least one of which is a heat resistant cable, to the flat plate. The conduits and the at least one heat resistant cable are heat resistant for withstanding at least temperatures for annealing of the coiled tubing and the cable. The flat plate is then formed into a slit tubular having a longitudinal joint. The longitudinal joint is then sealed by welding to form coiled tubing and the coiled tubing and the one or more conduits are annealed at an annealing temperature for an annealing time.

In another broad aspect, a method of manufacturing coiled tubing from a strip of metal flat plate comprises forming a groove in the strip of metal flat plate of the coiled tubing. A heat resistant conduit is fit within the groove. The heat resistant conduit is resistant to at least annealing temperatures. The flat plate is formed into a slit tubular having a longitudinal joint. The longitudinal joint is sealed by welding to form coiled tubing and the coiled tubing and the one or more conduits are annealed at an annealing temperature for an annealing time.

After annealing, secondary conduits which may or may not be heat labile, including but not limited to fiber optics, can be installed within the empty tubulars in the coiled tubing bore or within empty tubulars or an open bore in the heat resistant cable.

BRIEF DESCRIPTION OF THE DRAWINGS

FIG. 1A illustrates a strip of a flat metal plate for forming a coiled tubing, FIG. 1B illustrates a slit tubular formed from the plate of FIG. 1A, the slit tubular having a longitudinal joint, FIG. 1C illustrates sealing the longitudinal joint in the tubular of FIG. 1B, FIG. 1D illustrates subjecting the tubular of FIG. 1C to heat treatment, and FIG. 1E illustrates the tubular of FIG. 1D undergoing non-destructive examination;

FIG. 2A illustrates a strip of a flat metal plate, FIG. 2A.5 illustrates attachment of a retainer to the plate of FIG. 2A, FIG. 2B illustrates a slit tubular formed from the plate of FIG. 2A.5, the slit tubular having a longitudinal joint, FIG. 2C illustrates sealing the longitudinal joint in the tubular of FIG. 2B, FIG. 2D illustrates subjecting the tubular of FIG. 2C to heat treatment, and FIG. 2E illustrates the tubular of FIG. 2D undergoing non-destructive examination;

FIG. 3A shows a manufacturing configuration where rolls of the flat plate, slickline and the retainer are joined prior to forming the slit tubular;

FIG. 3B shows a manufacturing configuration where rolls of the flat plate and the retainer are joined prior to forming the slit tubular and the wireline is installed after the heat treatment, and FIG. 3C shows a manufacturing configuration where rolls of the flat plate and the wireline are joined prior to forming the slit tubular;

FIG. 4A shows an embodiment where the retainer is welded to the flat metal plate and the retainer extends along a select portion of the slickline or wireline;

FIG. 4B shows an embodiment where the retainer is sealingly attached to the flat metal plate by spot welding for forming a pressure chamber;

FIG. 4C shows an embodiment where the retainer is sealingly attached to the flat metal plate by continuous welding for forming a pressure chamber;

FIG. 4D shows an embodiment where an airspace is provided between the slickline or wireline and the flat plate, the figure also identifies a curved portion of the retainer;

FIG. 4E shows an embodiment where an airspace is provided between the slickline or wireline and the flat plate, the figure also identifies the sealed pressure chamber being formed by the retainer;

FIG. 4F shows an embodiment where wireline is connected or secured to the flat plate without the retainer, and FIG. 4G shows an embodiment where a plurality of runs of slickline or wireline is provided;

FIG. 5A illustrates a coiled tubing comprising a slickline retained in a retainer;

FIG. 5B illustrates the coiled tubing of FIG. 5A in an uncoiled position;

FIG. 5C illustrates attachment of a conduit to one end of the slickline;

FIG. 5D illustrates pulling of the slickline from the coiled tubing for leaving the conduit of FIG. 5C within the retainer in the coiled tubing;

FIG. 5E illustrates completion of the step shown in FIG. 5D leaving the conduit within the retainer in the coiled tubing, and FIG. 5F illustrates the coiled tubing comprising the slickline retained in the retainer;

FIG. 11A is a magnified isometric view of the retainer of FIG. 10;

FIG. 11B is an isometric view of the retainer of FIG. 10 wherein the cavity is a sealed cavity;

FIG. 15A illustrates a heat resistant conduit welded to flat plate used for forming coiled tubing;

FIG. 15B illustrates the flat plate formed into a slit tubular; and

FIG. 15C illustrates the slit tubular welded along a longitudinal joint for sealing and forming the coiled tubing;

DETAILED DESCRIPTION

Generally, embodiments disclosed herein provide a method and system for providing coiled tubing or other tubular with secured wireline.

Figure 1A:
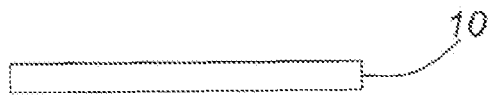
FIGS. 1A to 1E are simplified schematics depicting the steps in a prior art method of making longitudinally welded coiled tubing, more particularly.
Figure 1B:
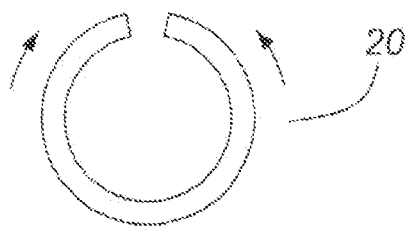
Figure 1C:
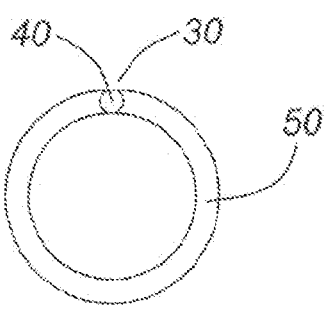
Figure 1D:
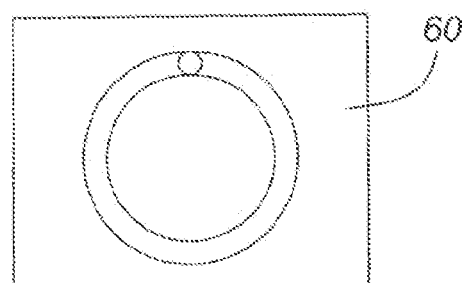
Figure 1E:
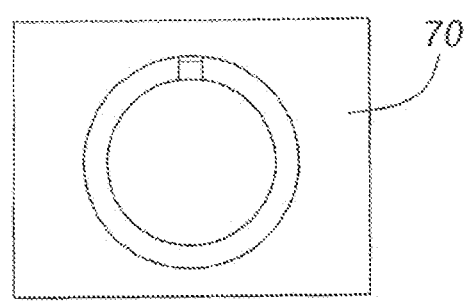

Referring to FIGS. 1A to 1E, the typical (simplified) steps in manufacturing coiled tubing include forming flat plate 10 (e.g. skelp) (FIG. 1A) into a slit tubular 20 forming a longitudinal joint 30 (FIG. 1B), sealing the longitudinal joint 30 (FIG. 1C), for example by application of a weld 40 to form a tubular 50. In other words, steps in manufacturing include forming the flat plate into a slit tubular having a longitudinal joint and welding the longitudinal joint to form coiled tubing. The tubular 50 may be, for example, conventional jointed tubing or coiled tubing. The tubular 50 may then be passed through heat treatment 60 (FIG. 1D), for example annealing or other treatment. The tubular 50 may undergo non-destructive examination and/or testing 70 (FIG. 1E). In the case of coiled tubing, the length of the tubular 50 is then coiled onto a reel.

Figure 2A:
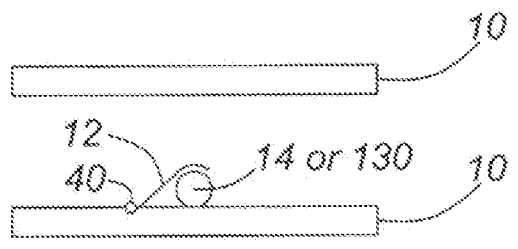
FIGS. 2A to 2E are simplified schematics depicting a method of making coiled tubing in accordance with embodiments disclosed herein, more particularly.
Figure 2B:
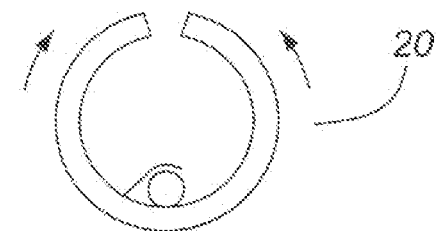
Figure 2C:
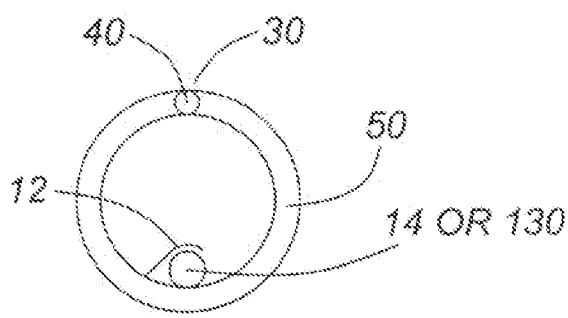
Figure 2D:
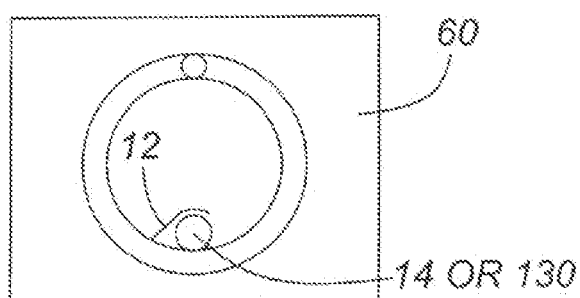
Figure 2E:
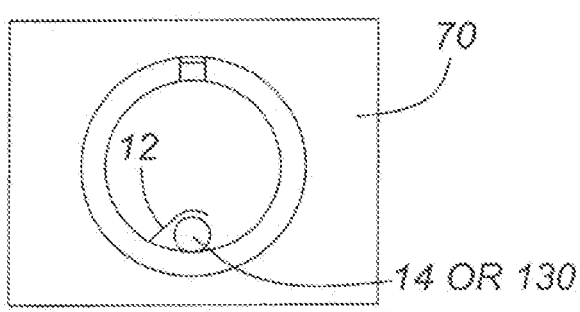

Referring to FIGS. 2A to 2E, a retainer 12 is attached to the flat plate 10 (FIG. 2A) prior to application of the weld 40 to the longitudinal joint 30. As depicted in FIG. 2A.5, the retainer 12 is preferably attached while the flat plate 10 is flat or substantially flat prior to forming, but one skilled in the art would recognize that the plate may be at least partially formed into the slit tubular 20 prior to the attachment of the retainer 12.

The retainer 12 is adapted to retain a wire rope or cable or metallic wire or other flexible member, preferably the retainer 12 is adapted to retain a small diameter steel member known as slick wireline or slickline 14. Alternatively, the retainer 12 is adapted to retain a heat resistant wireline 130.

Figure 3A:
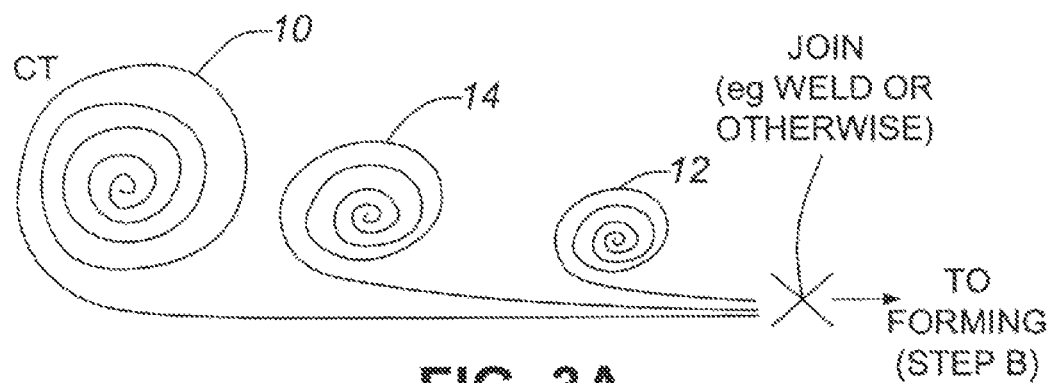
FIGS. 3A to 3C depict two manufacturing configurations of embodiments disclosed herein, more particularly.
Figure 3B:
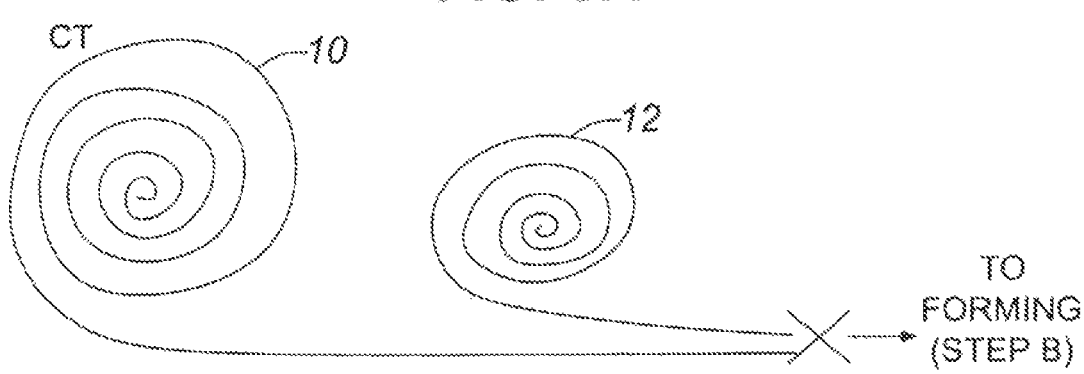
Figure 3C:
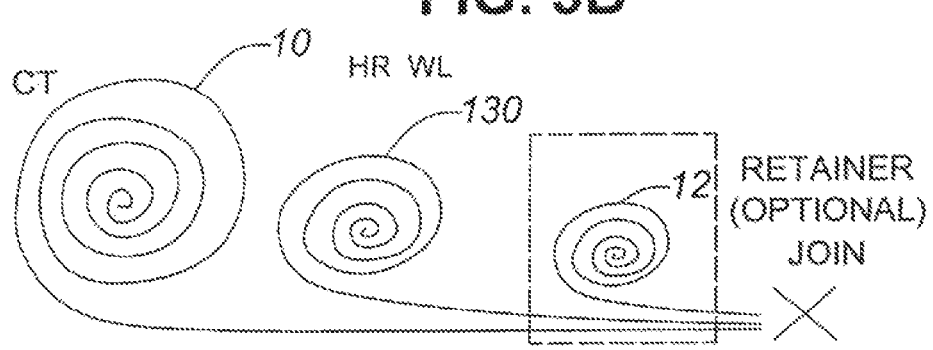

Referring to FIGS. 3A to 3C, representative manufacturing configurations are depicted. In FIG. 3A, rolls of flat plate 10, slickline 14, and retainer 12 (either as flat plate pre-formed into a shaped retainer) may be joined (for example welding) prior to forming the slit tubular 20. The slickline is replaced with the conduit 22 such as wireline 26 after heat treatment 60.

In FIG. 3B, rolls of flat plate 10 and retainer 12 (either as flat plate pre-formed into a shaped retainer) may be joined (for example welding) prior to forming the slit tubular 20. In this configuration, the wireline 26 may be installed into the retainer 12 after heat treatment 60.

In FIG. 3C, rolls of flat plate 10 and heat resistant wireline 130 are joined. Optionally, retainer 12 (either as flat plate pre-formed into a shaped retainer) may also be joined (for example welding) prior to forming the slit tubular 20.

The manufacturing of tubulars such as joints of conventional tubing or lengths of coiled tubing is preferably a continuous, or semi-continuous process, and preferably the slickline 14 or heat resistant wireline 130, and optionally retainer 12 are introduced into that process at a velocity that is substantially equal to the velocity of the flat plate 10. The retainer 12 may be preformed into a desired shape, or may be formed from flat plate proximate to or as the flat plate 10 is formed into the slit tubular 20.

Figure 4A:
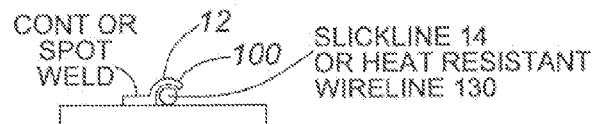
FIGS. 4A to 4G are simplified depictions of a number of alternate embodiments disclosed herein, more particularly.
Figure 4B:
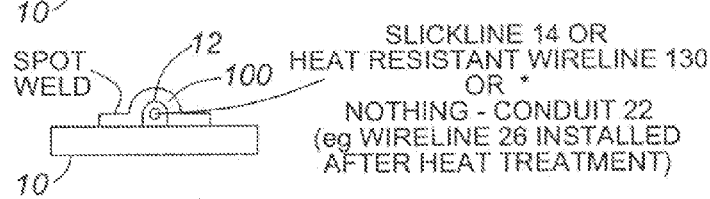
Figure 4C:
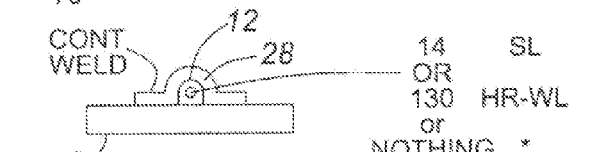
Figure 4D:
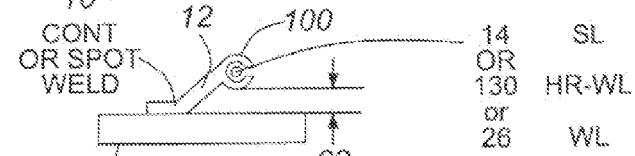
Figure 4E:
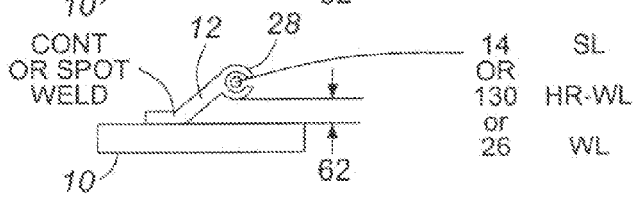
Figure 4F:
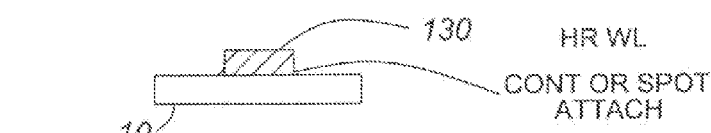

Referring to FIGS. 4A to 4G, embodiments are depicted. In one alternate embodiment heat resistant wireline 130 is retained within the retainer 12 rather than the slickline 14. The heat resistant wireline 130 may be adapted to withstand the heat treatment 60, which may be a relatively high temperature but only for a short period of time. In a further alternate embodiment and as shown in FIG. 4F, the heat resistant wireline 130 is connected or secured to the flat plate 10 without a retainer 12, for example by bonding, adhesive, glue or otherwise, including welding. The heat treatment 60 may form the bond, for example by thermally activated or cured adhesive or soldering.

In one embodiment and as shown in FIGS. 4D and 4E, the heat resistant wireline 130 may be designed, by material selection, by insulation (air space 62, ceramic etc.) to withstand the heat treatment 60. The heat treatment 60 may include annealing at a suitable temperature and duration (for example 1200 degree F.-1400 degree F. for a duration of seconds). The air space 62 provides insulation between the heat resistant wireline 130 (or wireline 26) so that the heat treatment 60, for example annealing by induction heating, treats the tubular 50, but does not damage the wireline 26 or heat resistant wireline 130.

The retainer 12 is preferably attached to the flat plate 12 by welding but may be otherwise connected, for example by adhesive or integrally formed within the flat plate 12. The retainer 12 may extend along select portions of the slickline 14 or may extend substantially continuously along the slickline 14, forming a track or race 16. The retainer 12 may be spot welded (FIGS. 4A, 4B, 4D, 4E, 4F and 4G) with gaps between adjacent welds), tack welded, etc. to the flat plate 10 along the length of the retainer 12, having a gap between welds to increase flexibility of the retainer 12 relative to the coiled tubing, or the retainer 12 may be fully welded or continuously welded to the flat plate 10 along the length of the retainer 12 (FIGS. 4A, 4C, 4D, 4E, 4F and 4G). The retainer 12 may be made of a material similar or substantially the same as the flat plate 10 thus providing sufficient ductility without the need for gaps between welds.

In certain configurations, the retainer 12 may be continuously welded to the flat plate 10 along the length of the retainer thus forming a sealed pressure chamber 28 (for example, see FIGS. 4C and 4E). The slickline 14 or heat resistant wireline 130 may be installed within the pressure chamber 28 during forming of the slit tubular 20 prior to heat treatment 60, or may be installed subsequently.

The slickline 14 is preferably retained by the geometry of the retainer 12, such that the retainer 12 retains the slickline once the retainer 12 is attached to the flat plate 10, the retainer 12 forming the track or race 16 for the slickline. Preferably, the slickline 14 is inserted into the retainer 12 prior to the retainer 12 being attached to the plate. The slickline 14 is axially movable within the retainer 12 to provide for pulling the slickline 14 axially from the retainer 12 (see below) but the slickline 14 may be geometrically or otherwise movably retained within retainer 12.

With the retainer 12 attached (and retaining the slickline 14) the coiled tubing is formed into the slit tubular 20, and the weld 40 applied to seal the longitudinal joint 30 to form the tubular 50. The tubular 50 may be, for example, conventional jointed tubing or coiled tubing. The tubular 50 may then be passed through heat treatment 60, for example annealing or other treatment. The tubular 50 may undergo non-destructive examination and/or testing 70. In the case of coiled tubing, the length of the tubular 50 is then coiled onto a reel. The flexible member (e.g. slickline 14) is substantially unaffected by the welding step and heat treatment step or steps etc.

The retainer 12 may optionally form a chamber 28 which may be a sealed (pressure retaining) chamber 28. In which case the chamber 28 is empty (no slickline nor heat resistant wireline is installed during milling of the tubular 50), but wireline may be installed after, for example by pumping the wireline through the cavity or chamber 28 or by hanging the tubular 50 in a well and dropping the wireline into the chamber 28 by gravity.

The retainer 12 may optionally be made of or include non-metallic materials, such as fibreglass, plastic, or ceramic, and may be attached to the flat plate by appropriate means, such as adhesive, glue, fusion, solder, welding and the like.

Figure 5A:
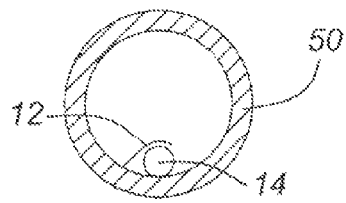
FIGS. 5A-5F are simplified depictions of a method of installing a conduit into a coiled tubing in accordance with embodiments disclosed herein, more particularly.
Figure 5B:
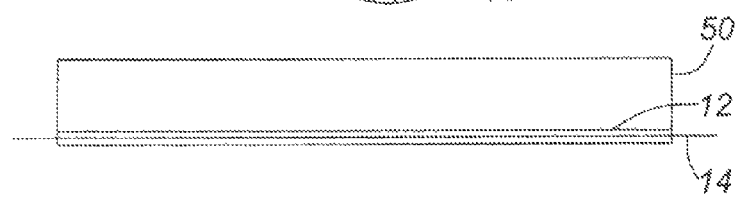
Figure 5C:
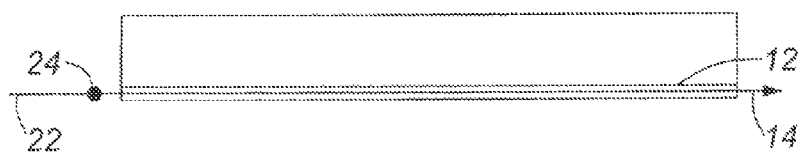
Figure 5D:
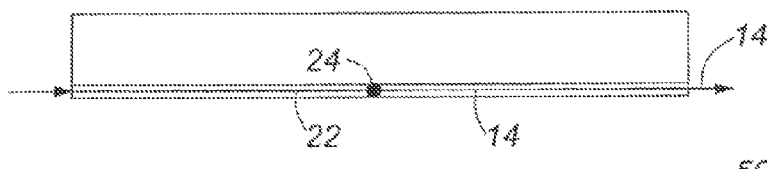
Figure 5E:
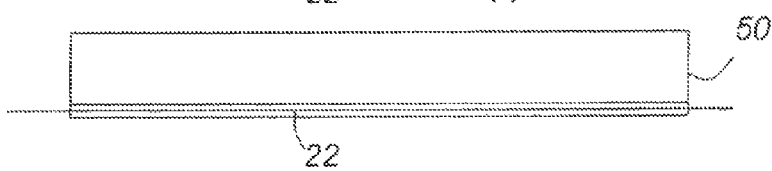
Figure 5F:
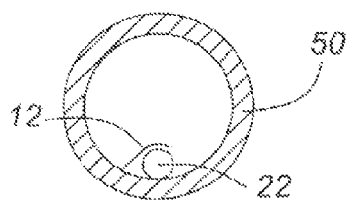
Figure 6:
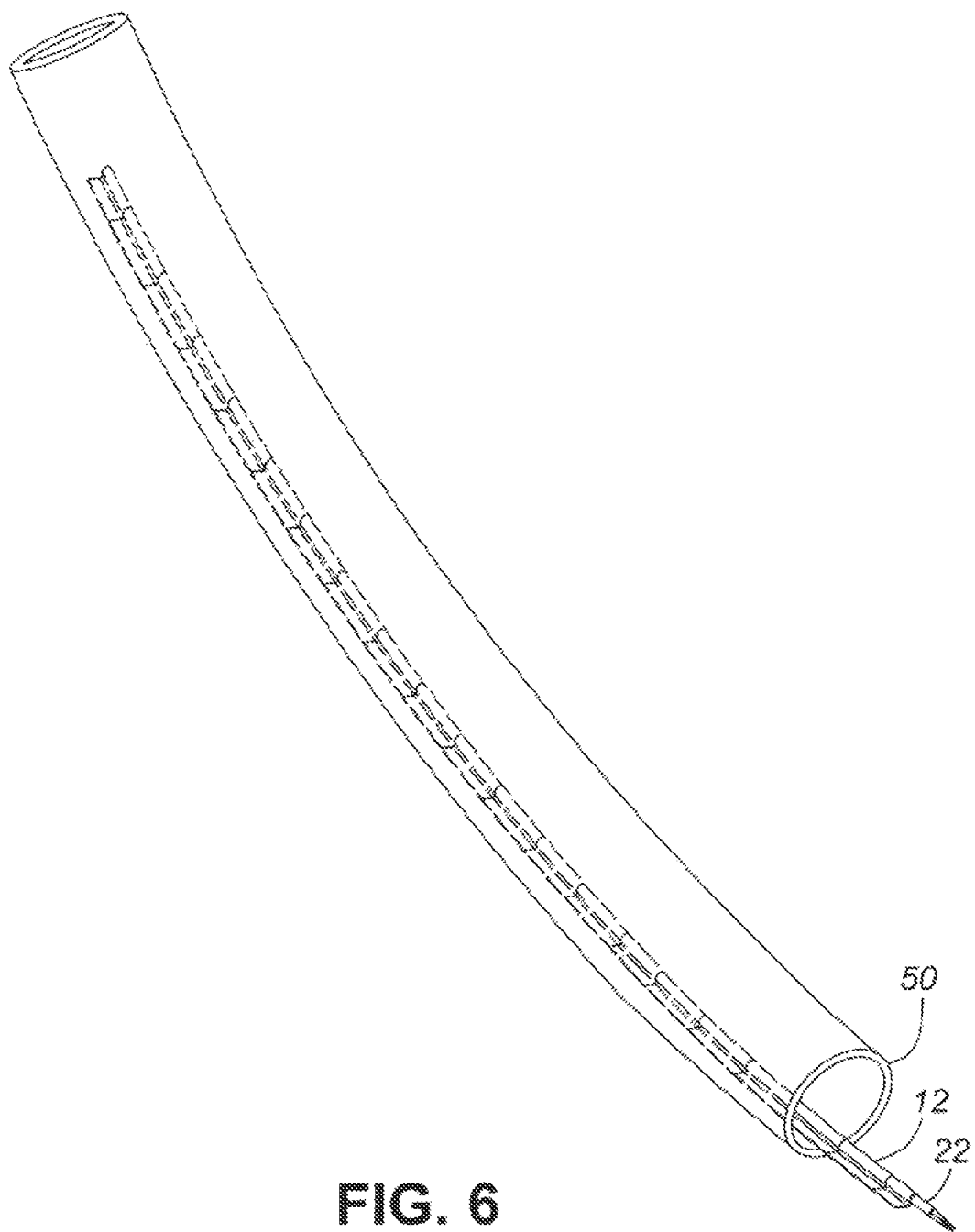
FIG. 6 is a semi-transparent isometric view of coiled tubing with a retainer according to embodiments disclosed herein.
Figure 7:
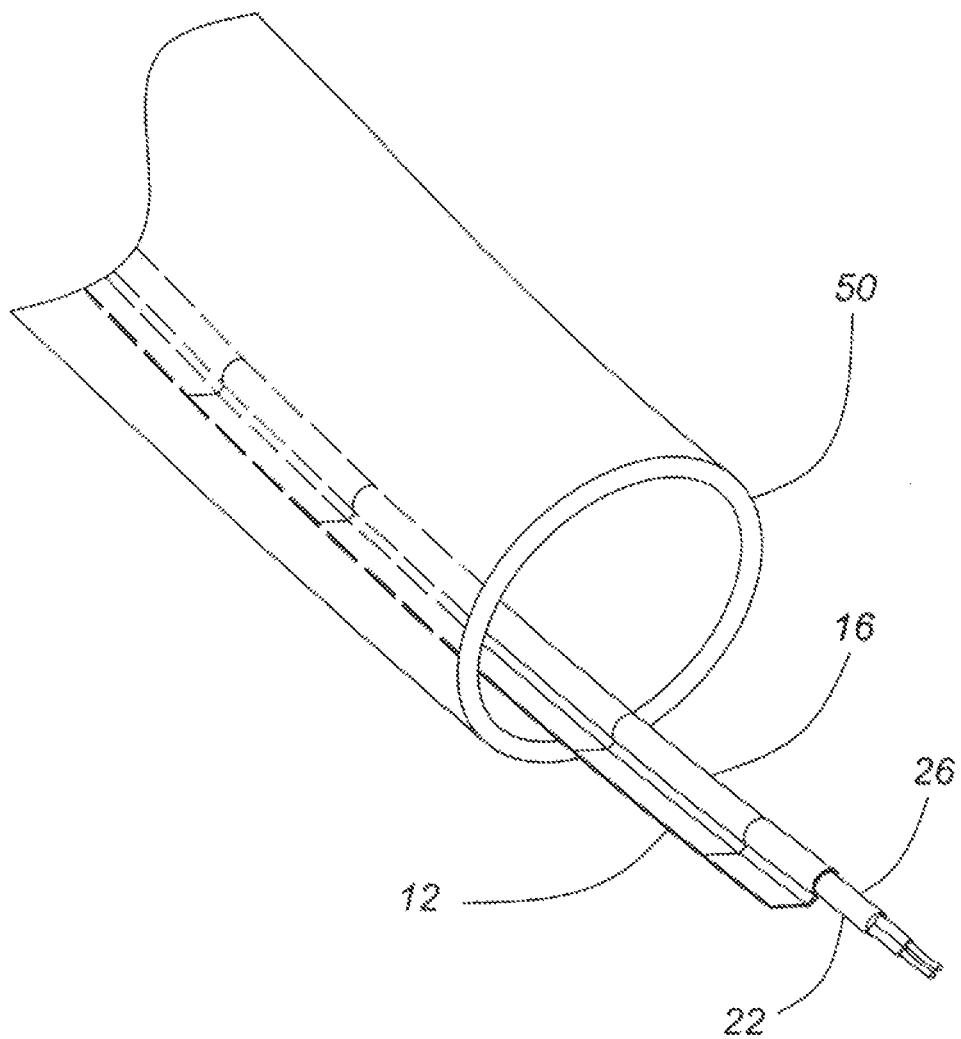
FIG. 7 is a magnified semi-transparent isometric view of the coiled tubing with retainer of FIG. 6.
Figure 8:
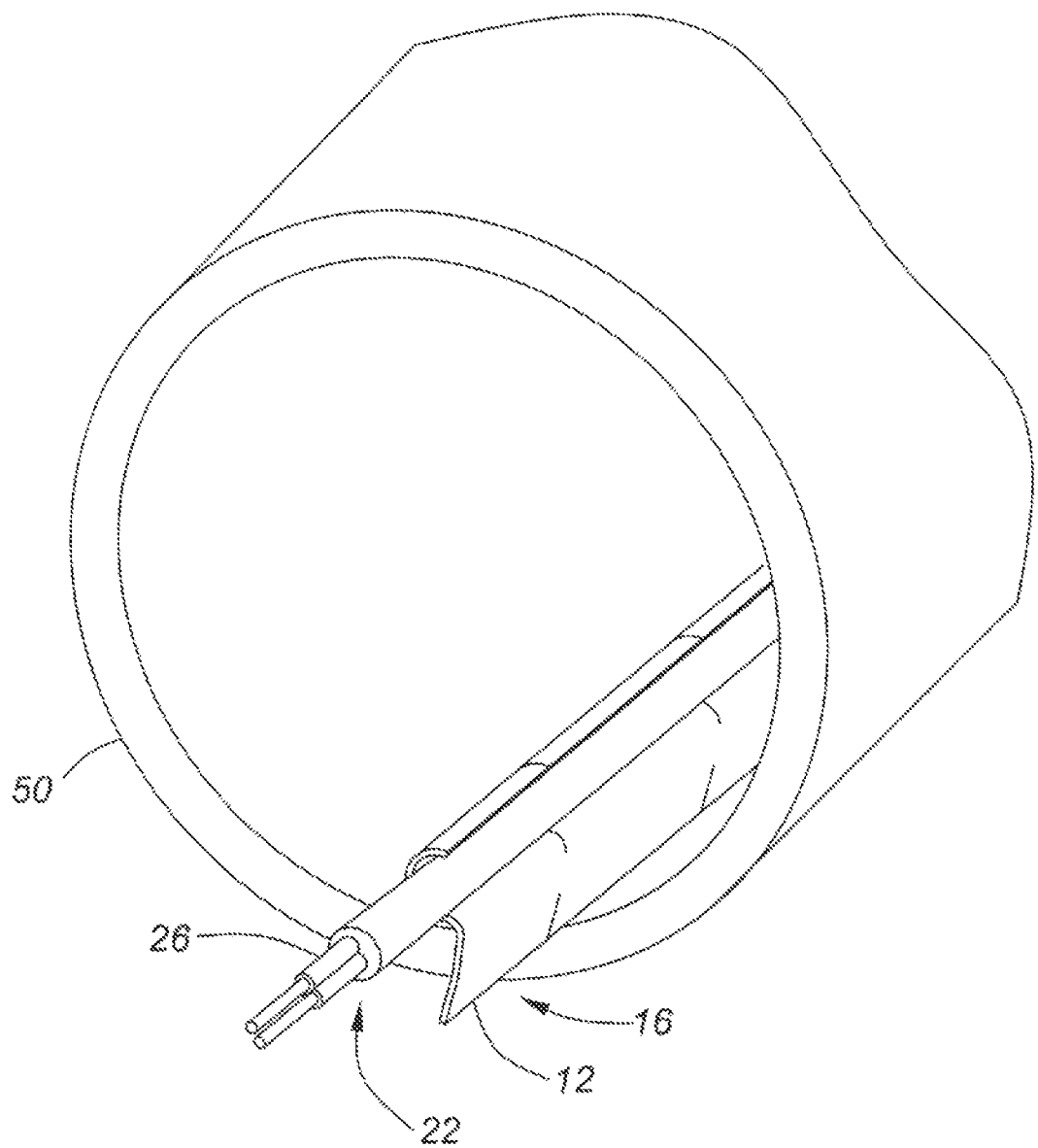
FIG. 8 is a magnified semi-transparent isometric view of the coiled tubing with retainer of FIG. 6.
Figure 9:
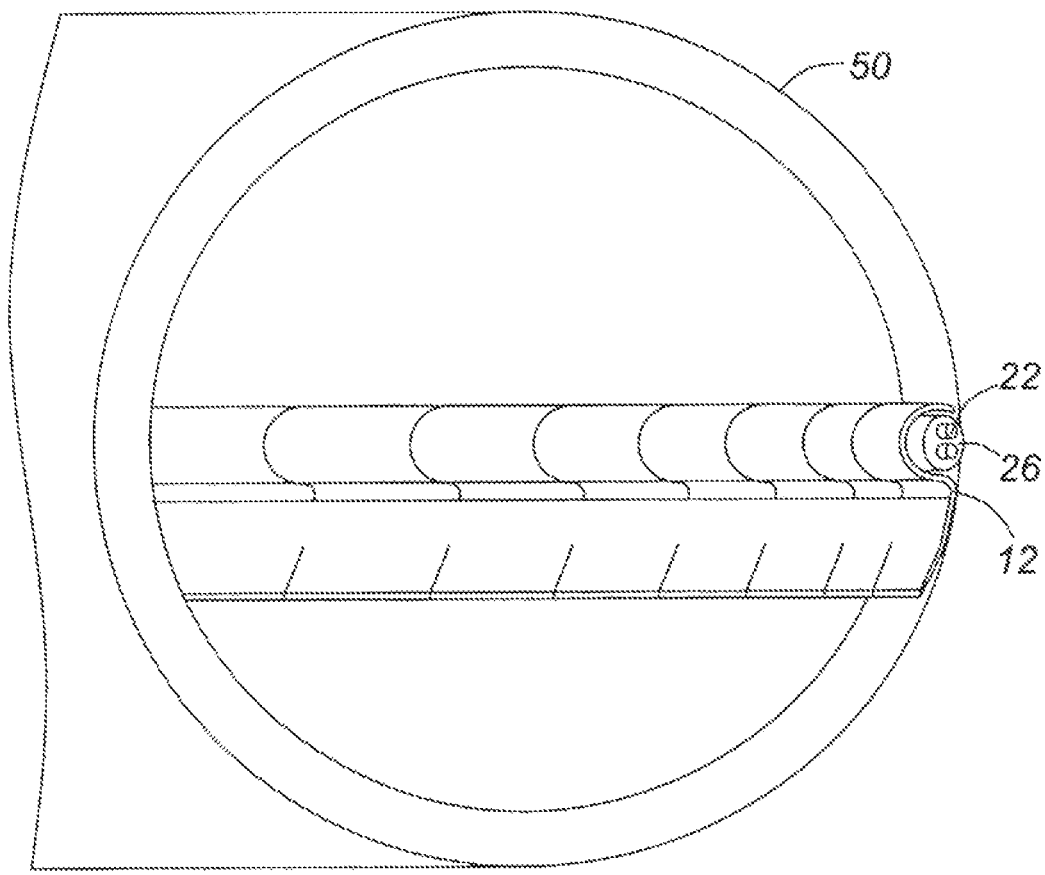
FIG. 9 is a magnified semi-transparent isometric view of the coiled tubing with retainer of FIG. 6.

Referring to FIGS. 5A to 5F, in embodiments where the slickline 14 is first installed and then replaced with the conduit 22, the tubular 50 (FIG. 5A, in this case coiled tubing) having the retainer 12 and the slickline 14 retained in the retainer 12 is uncoiled (FIG. 5B). A conduit 22 is attached to one end of the slickline 14 at attachment 24 (FIG. 5C), and the other end of the slickline 14 pulled to fish the conduit 22 through the retainer 12 such that the slickline 14 is removed from the retainer 12 and replaced with the conduit 22 (FIGS. 5D and 5E). The coiled tubing is then coiled back onto a reel (FIG. 5F). Alternatively, for shorter lengths, the coiled tubing does not have to be uncoiled and the conduit 22 (preferably wireline 26) may be pulled into the coiled tubing on the coil.

While the preferred conduit 22 is wireline or electric line (either for delivery of electrical power to the bottom hole assembly (BHA) or sending/receiving data or control signals to/from the BHA or a combination of power, control, or data), one skilled in the art recognizes that other conduits may be used, for example, single or multiple-conductor coax, single or multiple-conductor cable (for example mono cable, two or three conductor cable or seven strand conductor known as 'hepta cable' etc.), fibre optic, small diameter tubing for fluid conveyance, etc. The wireline may be armored or not, and may be single wrapped or dual wrapped. The wireline may preferably be in the typical size range of between about 7/32" and about 3/4" but other sizes may be used.

Referring to FIGS. 6-9, a conduit 22 in the form of a wireline 26 or heat resistant wireline 130 (two conductor wireline as just one example) is shown in the retainer 12 within the tubular 50. In the case of regular wireline 26, the wireline 26 may be installed by first installing the slickline 14 and fishing the wireline 26 into the retainer 12 after the heat treatment 60. In the case of heat resistant wireline 130, the heat resistant wireline may be installed directly in the retainer 12 prior to the heat treatment 60.

Figure 10:
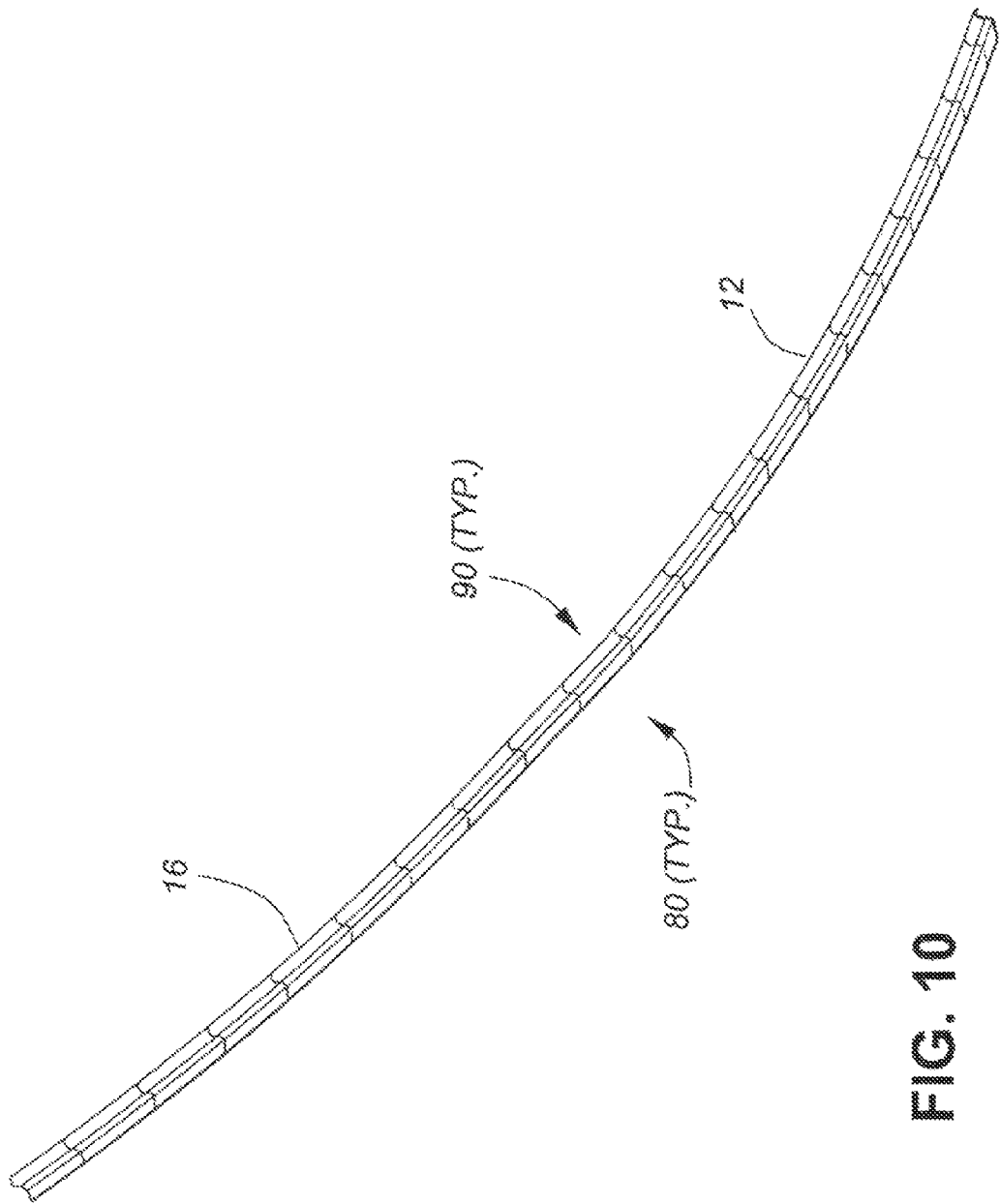
FIG. 10 is an isometric view of a retainer according to embodiments disclosed herein.
Figure 12:
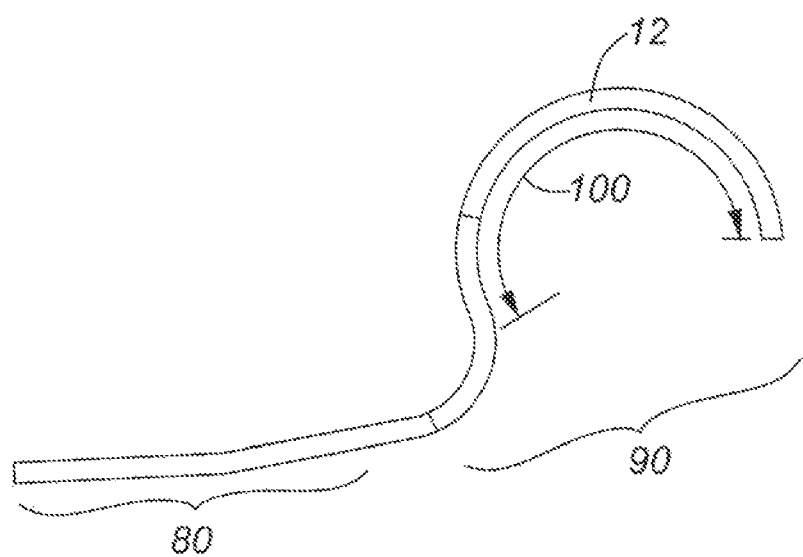
FIG. 12 is a cross-section view of the retainer of FIG. 10.
Figure 13:
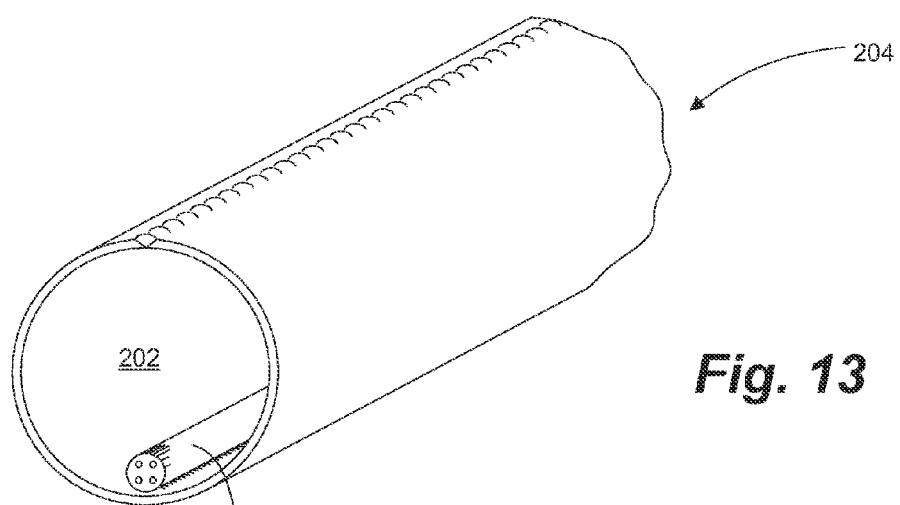
FIG. 13 is a perspective view of an embodiment of coiled tubing wherein a heat resistant conduit is welded directly to flat plate prior to forming and annealing the coiled tubing.
Figure 14:
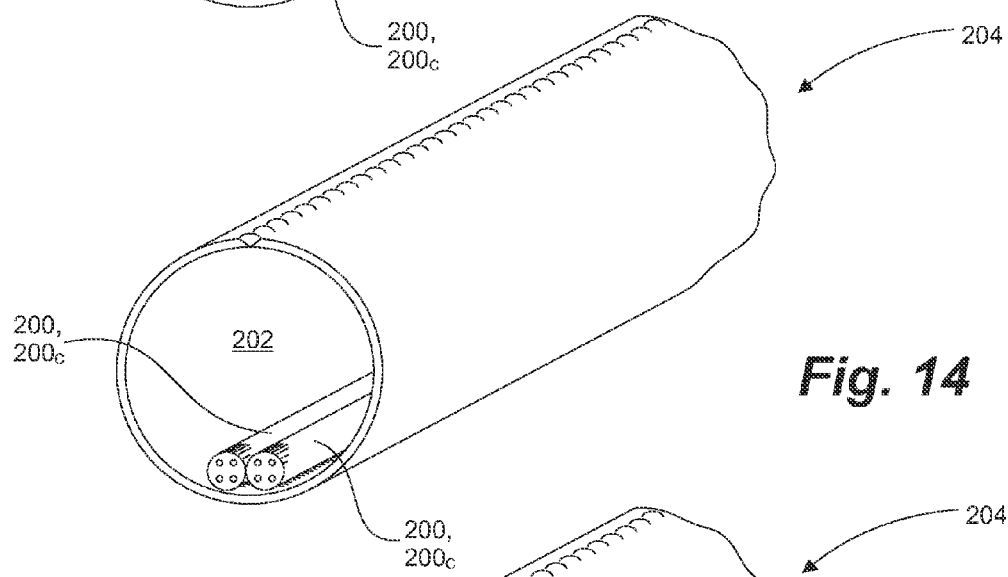
FIG. 14 is a perspective view of an embodiment of coiled tubing where two heat resistant conduits are welded directly to flat plate prior to forming and annealing the coiled tubing.

Referring to FIGS. 10-12, the retainer 12 has a fixed portion 80 and a free portion 90, the fixed portion 80 attached to the flat plate 10 and the free portion 90 extending from the fixed portion 80 to remain unattached. The free portion 90 may include a curved portion 100, the curved portion 100 adapted to frictionally retain the slickline 14 within the retainer 12.

The fixed portion 80 and/or the free portion 90 may include slots 110 along the length of the retainer 12 to increase flexibility. As depicted, the slots 110 may be formed into both the free portion 90 and the fixed portion 80, provided there remains a connection/bridge 120 (see FIG. 9) between adjacent sections. While shown between the fixed region and the free region, the connection/bridge may instead be in the fixed region or the free region. The free portion 90 may form a cavity 92 which may be sealed for retaining pressure (FIG. 11B) or may not be a sealed cavity (FIG. 11A).

In another embodiment, the retainer 12 has two fixed portions 80 with a free portion 90 in-between, forming a double retainer. Alternately, a plurality of runs of slickline 14 or heat resistant wireline 130 may be provided. The heat resistant wireline 130 can be provided as one or more of the plurality of runs or installed within retainer 12. (See FIG. 4G).

While depicted as a continuous retainer 12 forming the track or race 16, one ordinarily skilled in the art recognizes that the fixed portion 80 and/or the free portion 90 could have substantial gaps between adjacent retainers 12. While the retainer 12 is depicted as having slots 110 in the fixed portion 80 and the free portion 90, the retainer may be substantially continuous to provide for the pressure chamber 28 for example by sealingly attaching the retainer 12 to the flat plate 10.

Figure 4G:
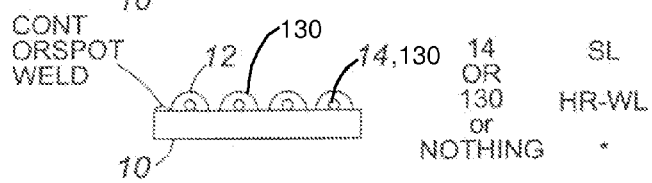

In another embodiment, as introduced earlier in FIG. 4F, the heat resistant conduit such as heat resistant wireline 130 can be attached directly to the flat plate 10. One form of attachment includes welding to the flat plate 10. Welding can include continuous welding, semi-continuous welding or spot welding. Alternatively, as shown in FIG. 4G, the heat resistant conduit such as heat resistant wireline 130, can be installed into retainer 12, the retainer itself having been attached such as by welding to the flat plate 10. A plurality of runs of slickline 14 or heat resistant wireline 130 may be provided within retainer 12. As shown in FIG. 4G, slickline 14, heat resistant wireline or nothing at all can be located within the retainer 12. By leaving a retainer 12 without an installation at all enables either use as a fluid conduit or, as set forth in FIG. 4B, provides the retainer for a later installed conduit 22 such as slickline 14, heat resistant wireline 130 or other conduit 22 such as heat labile wireline 26 after heat treatment 60.

Further, and as shown in FIGS. 13 to 19B, one or more conduits 200 are attached to an inner wall 202 of coiled tubing 204, each conduit 200 being resistant to elevated temperatures, such as annealing temperatures applied once. At least one of the conduits 200 is a heat resistant cable 200c. The heat resistant conduits 200 can be, but are not limited to, wireline, electric line or cable or an empty tubular. Of the conduits 200 that are electrical-conductive, one such heat resistant cable 200c is a magnesium oxide insulated (MI) cable, available from Petrospec Engineering Ltd. of Sherwood Park, Alberta, Canada. MI cable can be welded directly to the flat plate 206 which is rolled to form the coiled tubing 204. Neither the attachment, nor the heat treatment, despite the heat resistant cable 200c being in direct thermal contact with the flat plate 206, adversely affects the function of the heat resistant cable 200c.

Figure 15A:
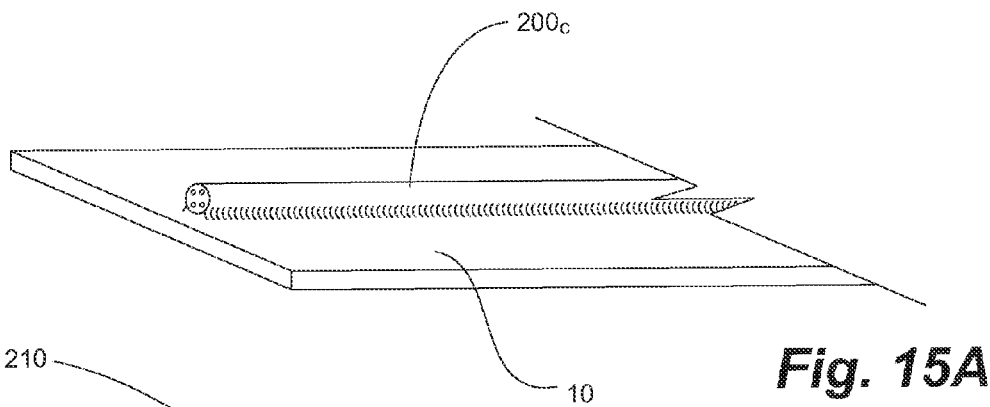
FIGS. 15A to 15C are schematics illustrating a method of forming coiled tubing having one or more heat resistant conduits welded to an inner wall thereof, more particularly
Figure 15B:
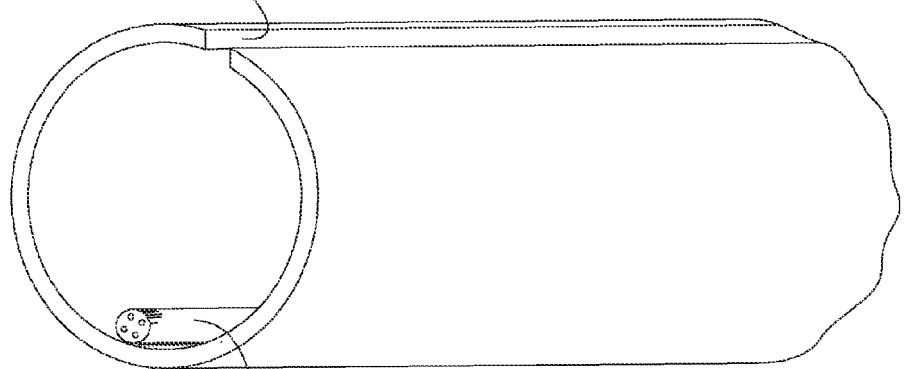
Figure 15C:
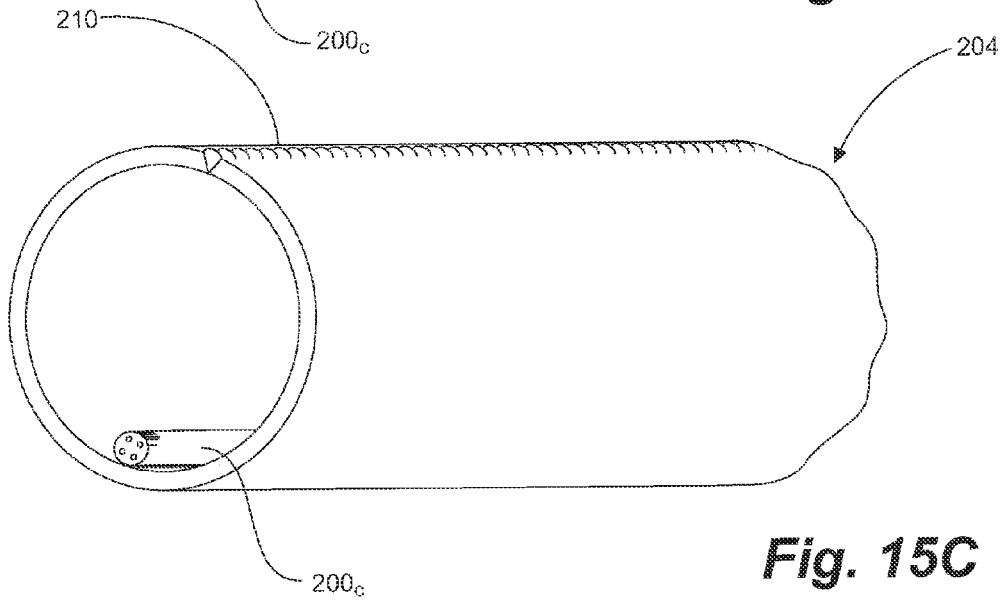

Having reference to FIGS. 15A to 15C, the one or more conduits 200 are welded directly to flat plate 10 used for manufacturing the coiled tubing 204 (FIG. 15A). Where there are more than one conduit 200, the conduits 200 can be welded adjacent one another to collect the conduits 200 along one side of the finished coiled tubing 204, maximizing the cross-section of the bore available for fluid or other elements passing therethrough.

As before for earlier embodiments, the welding to the flat plate 10 can be continuous welding, semi-continuous welding or spot welding. The flat plate 10 is then rolled into the slit tubular 208 (FIG. 15B), forming a longitudinal joint 210 as is understood in the art. Thereafter, the longitudinal joint 210 is sealed by seam welding for forming the coiled tubing 204 (FIG. 15C). Following welding of the joint 210, the coiled tubing 204 may be passed through a series of heat treatments, including weld seam annealing and may include a heat treatment of the entire coiled tubing 204. Seam annealing may improve the quality and reduce the brittleness of the weld. Generally, such processes would be performed as understood in the art for conventional coiled tubing without the one or more conduits.

Figure 16:
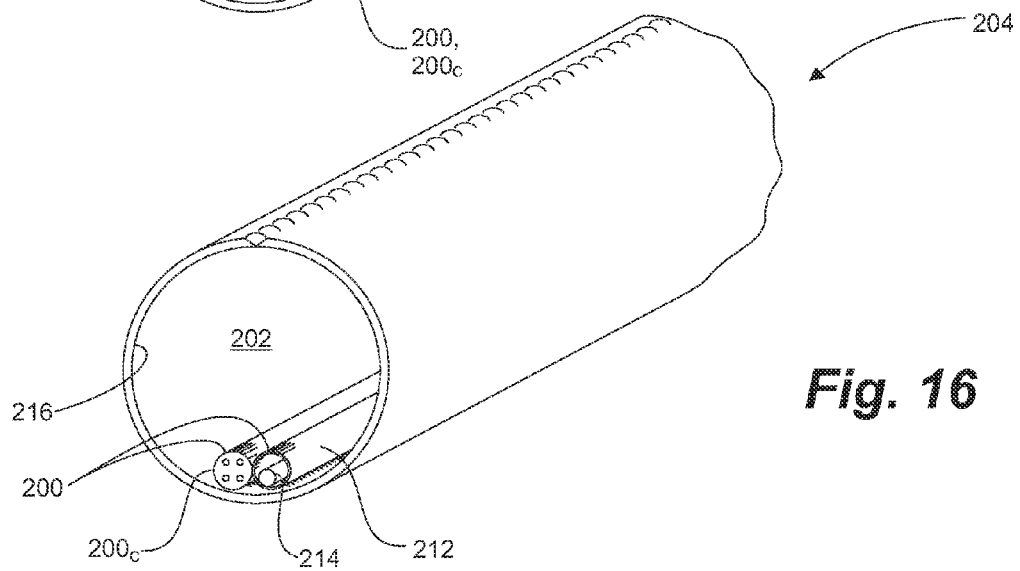
FIG. 16 is a perspective view according to FIG. 14, wherein one of the heat resistant conduits is an empty tubing.

As shown in FIG. 16, in an embodiment, at least one of the one or more conduits 200, other than the cable 200c, is an empty tubular 212, such as a steel tubular, which is resistant to annealing temperatures. Following heat treatment, secondary conduits, including heat labile conduits 214 such as fibre optic cable, can be inserted into the empty tubular 212, such as that illustrated in FIGS. 4B and 4C. Alternatively, the empty tubulars 212 can be used for transmission of fluids therethrough.

Applicant believes that fibre optic cable and other types of secondary conduits 214, heat labile or otherwise, can be readily deployed into the empty tubular 212 using means which are well understood in the art. Such means include, but are not limited to, fishing the secondary conduit 214 into the tubular 212 using a flexible line installed into the tubular before or after welding of the tubular 212 to the flat plate 10, by floating or pumping the secondary conduit 214 into the empty tubular 212, using vibration to advance the secondary conduit 214 through the empty tubular 212 or by dropping the secondary conduit 214 into the empty tubular 212 by gravity, the coil tubing 204 being first hung in a vertical portion of a wellbore.

The one or more heat resistant conduits 200, welded to the inner wall 202 of the coiled tubing 204 are smaller in diameter than an inner diameter of the coiled tubing 204. In embodiments, the area occupied by the conduits 200 is less than ½ of the cross-sectional area of the coiled tubing 204, leaving a major portion of a bore 216 through the coiled tubing substantially unobstructed for passage of at least fluids therethrough. As shown, collectively, the one or more conduits 200 occupy less than about one-half of the inside diameter or bore of the coiled tubing 204. Thus, the attachment between the inner wall 202 of the coiled tubing 204 and the conduit 200 is made along a contact or connection of the conduit 200 to the inner wall 202, typically by welding of the conduit 200 thereto.

As one of skill in the art will appreciate, coiled tubing 204 generally has a diameter from about 1" to about 5" and thus, the selection or size of the conduits 200 can vary in size while still leaving a majority of the bore area available. Depending upon the coiled tubing size to be used for any given operation and the pumping rates which must be achieved for various operations using the coiled tubing 204, such as fracturing, the number of conduits 200 and the size or diameter of each of the one or more conduits 200 are selected so that a major portion of the bore 216 remains available for passage of fluids or conveyed apparatus and the like therethrough. In a common 2" or 2.5" coil tubing, each conduit 200 may be in the typical size range of between a diameter of about 7/32" and about 3/4" but other sizes may be used.

Figure 17A:
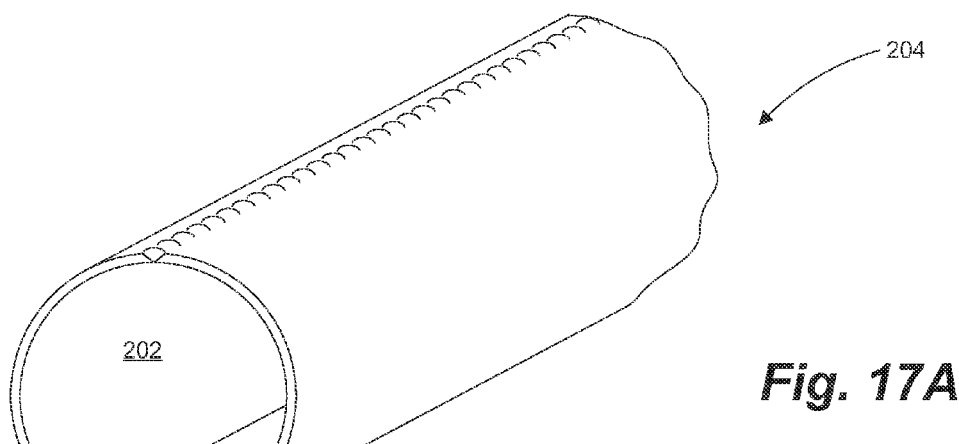
FIG. 17A is a perspective view of the coiled tubing of FIG. 13 wherein the heat resistant conduit further comprises a heat resistant cable housed therein.
Figure 17B:
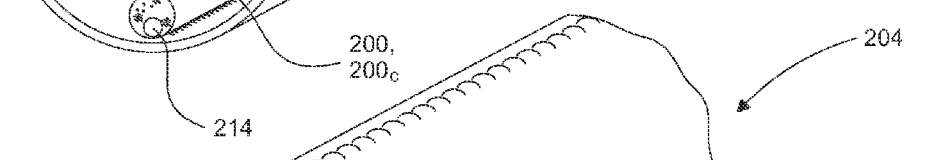
FIG. 17B is a perspective view of the coiled tubing of FIG. 13 wherein the heat resistant conduit further comprises at least one heat resistant cable and at least one empty tubular housed therein.

As shown in FIGS. 17A and 17B, at least one heat resistant conduit 200, being at least one heat resistant cable 200c, is welded to an inside of the coiled tubing 204 as described herein. One or more secondary conduits 214 are housed within the heat resistant cable 200c. The secondary conduits 214, if heat resistant can also be housed within the cable 200 during manufacture of the coiled tubing 204 as described herein. Alternatively, if the secondary conduits 214 are heat labile or if the secondary conduits 214 are to be used for fluids, one or more empty tubulars 212 are also housed within the heat resistant cable 200. Once the coiled tubing 204 has been formed, secondary conduits 214, such as heat labile conduits, are installed within at least one of the one or more empty tubulars 212 within the heat resistant cable 200. One or more of the empty tubulars 212 can be left empty for transmission of fluids, such as hydraulic fluids, therethrough.

Figure 17C:
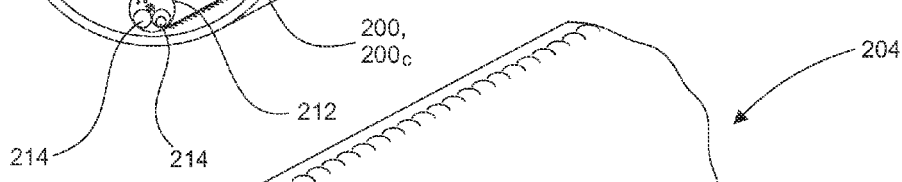
FIG. 17C is a perspective view of an embodiment wherein at least one heat resistant cable is housed within a heat resistant conduit welded to an inside wall of coiled tubing.

As shown in FIG. 17C, at least one heat resistant conduit 200, housing at least one heat resistant cable 200c, is welded to an inside wall 202 of the coiled tubing 204 as described herein. As one of skill will appreciate, one or more additional heat resistant conduits 200, such as empty tubulars 212, may also be housed within the welded heat resistant conduit 200. Further, or alternatively, the balance of a bore 221 of the heat resistant conduit 200 can be used for fluid transmission therethrough, such as for treatment fluid or an actuating fluid such as hydraulic fluid.

Figure 18A:
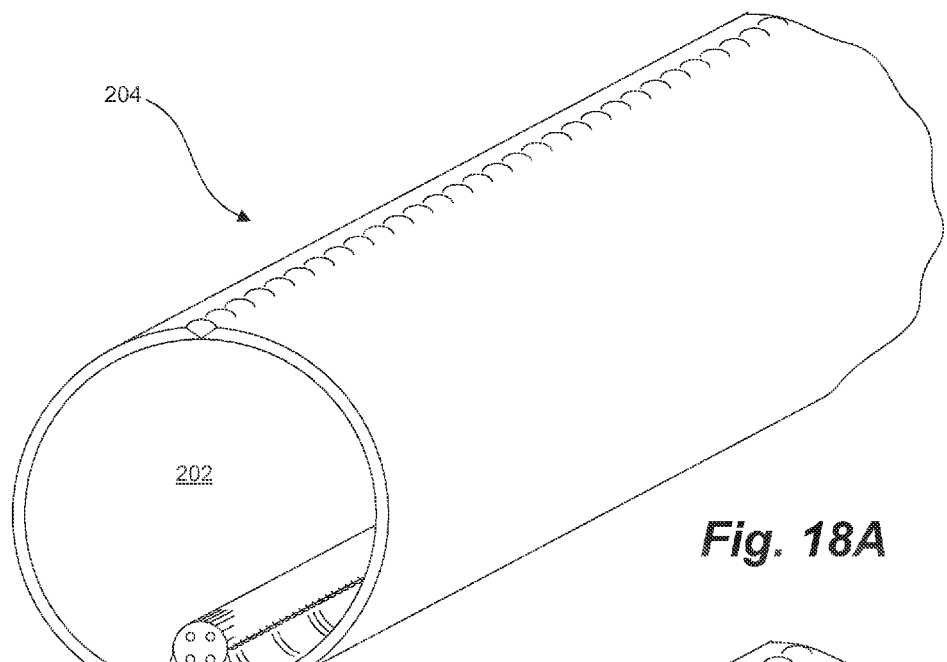
FIG. 18A is a perspective view of an alternate embodiment wherein a groove is formed on flat plate for forming CT, the groove extending along an inner wall of coiled tubing for retaining conduit therein.
Figure 18B:
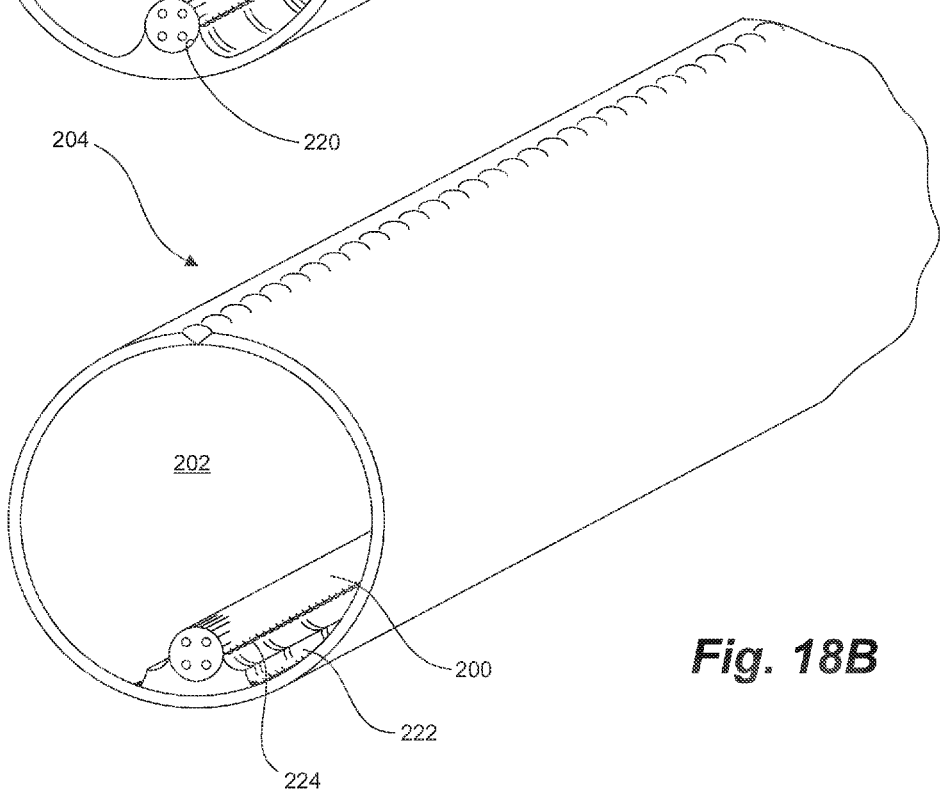
FIG. 18B is a perspective view according to FIG. 18A wherein the groove is formed by a grooved member welded to the flat plate.

In an alternate embodiment, and having reference to FIGS. 18A and 18B, heat resistant conduits 200 are affixed to the inner wall 202 of the coiled tubing 204 within a longitudinally extending groove 220, formed in the inner wall 202 or welded thereto. As one of skill will appreciate, the groove 220 can be continuous or can be discontinuous along a length of the coiled tubing 204. Further, two or more side-by-side grooves 220 can be formed on the inner wall 202 for retaining two or more heat resistant conduits 200 therein. As previously described, at least one of the two or more conduits 200 can be an empty tubular 212 through which a secondary conduit 214, such as heat labile conduit can be installed, by fishing, pumping, vibration or dropping in by gravity or the like, following annealing of the coiled tubing 204.

As with previously described embodiments, the groove 220 or side-by-side grooves 220 are formed in or on the flat metal plate 10. The grooves 220 can be formed directly in the flat plate 10 (FIG. 18A) or can be formed in a strip of compatible, heat resistant material forming a grooved member 222 which is welded or otherwise affixed to the flat plate 10 (FIG. 18B). Thereafter, the heat resistant conduit 200 is installed into the groove 220. The conduits 200 are retained within the groove 220, such as by crimping, friction fit, welding or the like.

In embodiments, the groove 220 is shaped so as to have a top opening 224 which is slightly smaller than a diameter of the conduit 200 such that force is required to install the conduit 200 therein. Thereafter, when the plate 10 is rolled for forming the coiled tubing 204, the opening 224 is further closed for retaining the conduit 200 therein. Alternatively, edges of the top opening 224 can be crimped against the conduit 200 for retaining the conduit 200 in the groove 220.

In another embodiment, the conduit 200 is welded into the groove 220, such as between the top opening 224 and an adjacent side of the conduit 200. The conduit can be welded along one or both sides adjacent the top opening 224. The welding can be continuous welding, semi-continuous welding or spot welding.

As with the previously describe embodiments, one or more secondary conduits 214 can be housed within the conduit 220 retained in the one or more grooves 220.

Figure 19A:
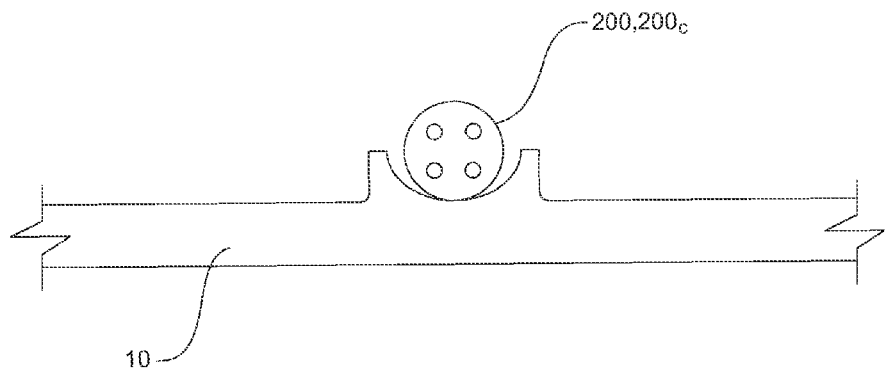
FIG. 19A is a partial end view of a flat metal plate having a groove formed therein for accepting a heat resistant conduit.
Figure 19B:
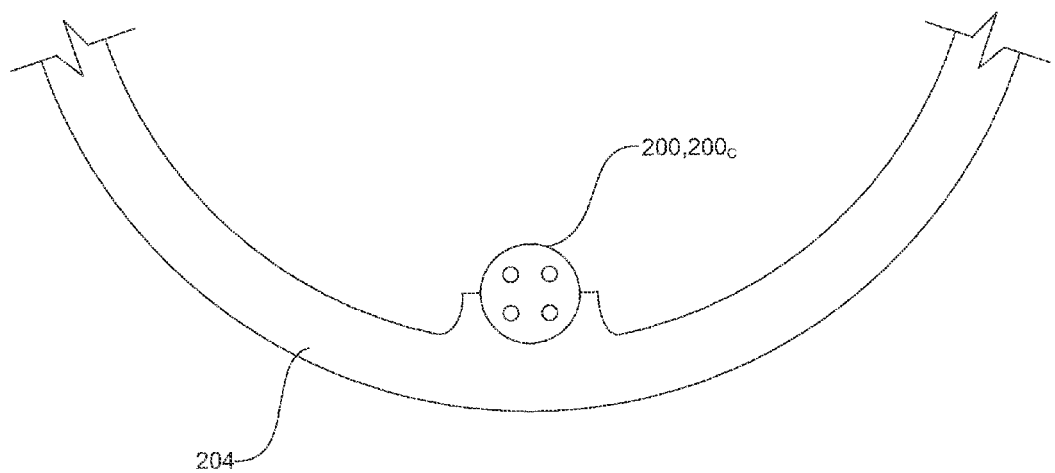
FIG. 19B is a partial end view according to FIG. 19A, illustrating deformation of a top opening of the groove inwardly against the conduit as the flat plate is rolled for forming the coiled tubing.

Having reference to FIGS. 19A and 19B, a heat resistant conduit 200, such as the heat resistant cable 200c, can simply be laid in the groove 200 formed in the flat metal plate 10. The groove 220 is sized to readily accept the conduit 200. Thereafter, during the rolling process, as the plate 10 is rolled into the substantially circular coiled tubing 204, the straddling portions of the top opening 224 of the groove 220 are displaced or otherwise deformed inwardly against the conduit 200, retaining the conduit 220 therein. The groove 220 can have a greater depth than is a radius of the conduit 200, aiding in retention therein.

The embodiments for which an exclusive property or privilege is claimed are defined as follows:

1. A method of manufacturing coiled tubing from a strip of metal flat plate comprising:
    welding two or more heat resistant conduits, at least one of which is a heat resistant cable and at least one which is an empty tubular, to the flat plate, the heat resistant conduits being heat resistant for withstanding at least temperatures for annealing of the coiled tubing and the cable;
    forming the flat plate into a slit tubular having a longitudinal joint;
    sealing the longitudinal joint by welding to form coiled tubing;
    annealing the coiled tubing and the one or more conduits at an annealing temperature for an annealing time; and
    following annealing
    pumping a secondary conduit into the empty tubular.

2. The method of claim 1 wherein the at least one heat resistant cable is wireline, electric line, mono cable or multi-conductor cable.

3. The method of claim 1 wherein the at least one heat resistant cable is magnesium oxide insulated cable.

4. The method of claim 1 further comprising welding the two or more conduits to the flat plate using continuous welding.

5. The method of claim 1 further comprising welding the two or more conduits to the flat plate using semi-continuous welding.

6. The method of claim 1 further comprising welding the two or more conduits to the flat plate using spot welding.

7. The method of claim 1 wherein each of the two or more heat resistant conduits has a diameter smaller than a diameter of the coiled tubing for leaving a major portion of a bore of the coiled tubing unobstructed.

8. The method of claim 1 wherein the secondary conduit is a heat labile conduit.

9. The method of claim 8 wherein the heat labile conduit is a fibre optic cable.

10. A method of manufacturing coiled tubing from a strip of metal flat plate comprising:
  welding a strip of material having a groove therein to the strip of metal flat plate of the coiled tubing;
  fitting a heat resistant conduit within the groove, the heat resistant conduit being resistant to at least annealing temperatures;
  forming the flat plate into a slit tubular having a longitudinal joint;
  sealing the longitudinal joint by welding to form coiled tubing; and
  annealing the coiled tubing and the one or more conduits at an annealing temperature for an annealing time.

11. The method of claim 10 wherein the fitting the heat resistant conduit further comprises:
  welding the heat resistant conduit into the groove.

12. The method of claim 10 further comprising:
  forming two or more side-by-side grooves in the strip of materials welded to the strip of metal flat plate of the coiled tubing, each of the two or more grooves retaining a heat resistant conduit therein.

13. The method of claim 10 wherein the at least one heat resistant cable is wireline, electric line, mono cable or multi-conductor.

14. The method of claim 12 wherein at least one of the two or more conduits is an empty tubular, the method, following annealing, further comprising:
  installing a secondary conduit into the empty tubular.

15. The method of claim 10, following fitting the heat resistant conduit within the groove, further comprising:
  crimping edges of an open top of the groove to the heat resistant conduit.

16. The method of claim 10 wherein the heat resistant conduit is a heat resistant cable having one or more heat resistant conduits housed therein, one of the heat resistant conduits in the cable being an empty tubular, the method, following annealing, further comprising:
  installing a secondary conduit in the empty tubular.

17. The method of claim 10 wherein the heat resistant conduit has at least two or more secondary heat resistant conduits housed therein, one of which is a heat resistant cable and the other being an empty tubular, the method following annealing further comprising:
  installing a secondary conduit in the empty tubular.

18. A method of manufacturing coiled tubing from a strip of metal flat plate comprising:
  welding two or more heat resistant conduits, at least one of which is a heat resistant cable and at least one of the one or more heat resistant conduits is an empty tubular, to the flat plate, the heat resistant conduits being heat resistant for withstanding at least temperatures for annealing of the coiled tubing and the cable;
  forming the flat plate into a slit tubular having a longitudinal joint;
  sealing the longitudinal joint by welding to form coiled tubing;
  annealing the coiled tubing and the one or more conduits at an annealing temperature for an annealing time; and following annealing
  hanging the coiled tubing in a vertical wellbore; and
  dropping a secondary conduit into the empty tubular by gravity.

19. The method of claim 18 wherein the at least one heat resistant cable is wireline, electric line, mono cable or multi-conductor cable.

20. The method of claim 18 wherein the secondary conduit is a heat labile cable.

21. The method of claim 1 wherein each of the one or more heat resistant conduits has a diameter smaller than a diameter of the coiled tubing for leaving a major portion of a bore of the coiled tubing unobstructed.

22. A method of manufacturing coiled tubing from a strip of metal flat plate comprising:
  forming two or more side-by-side grooves in the strip of metal flat plate of the coiled tubing, each of the two or more grooves retaining a heat resistant conduit therein, wherein at least one of the two or more conduits is an empty tubular;
  fitting a heat resistant conduit within the groove, the heat resistant conduit being resistant to at least annealing temperatures;
  forming the flat plate into a slit tubular having a longitudinal joint;
  sealing the longitudinal joint by welding to form coiled tubing;
  annealing the coiled tubing and the one or more conduits at an annealing temperature for an annealing time; and
  installing a secondary conduit into the empty tubular.

23. The method of claim 22 wherein the secondary conduit is a heat labile conduit.

24. The method of claim 23 wherein the heat labile conduit is fiber optic cable.

25. The method of claim 22 following fitting the heat resistant conduit within the two or more grooves, further comprising:
  crimping edges of an open top of each of the two or more grooves to the heat resistant conduits.

26. A method of manufacturing coiled tubing from a strip of metal flat plate comprising:
  forming a groove in the strip of metal flat plate of the coiled tubing;
  fitting a heat resistant conduit within the groove, the heat resistant conduit being a heat resistant cable resistant to at least annealing temperatures and having one or more heat resistant conduits housed therein, one of the heat resistant conduits in the cable being an empty tubular;
  forming the flat plate into a slit tubular having a longitudinal joint;
  sealing the longitudinal joint by welding to form coiled tubing;
  annealing the coiled tubing and the one or more conduits at an annealing temperature for an annealing time; and
  installing a secondary conduit into the empty tubular.

27. A method of manufacturing coiled tubing from a strip of metal flat plate comprising:
  forming a groove in the strip of metal flat plate of the coiled tubing;
  fitting a heat resistant conduit within the groove, the heat resistant conduit having at least two or more secondary heat resistant conduits housed therein, one of which is a heat resistant cable and one of which is an empty tubular;

forming the flat plate into a slit tubular having a longitudinal joint;
sealing the longitudinal joint by welding to form coiled tubing;
annealing the coiled tubing and the one or more conduits at an annealing temperature for an annealing time; and
installing a secondary conduit into the empty tubular.

* * * * *